United States Patent [19]
Toni et al.

[11] Patent Number: 5,674,586
[45] Date of Patent: Oct. 7, 1997

[54] PRESSURE TOLERANT FUEL TANK PANELS

[75] Inventors: Darryl Mark Toni, Madison; Bruce Henry Barr, Southbury; Edward Joseph Fabian, Derby; Bruce Fredric Kay, Milford; Joaquin Terceno, Stratford; Kenneth Morgan Furnes, Monroe; Alan Lee Dobyns, Milford, all of Conn.

[73] Assignee: United Technologies Corporation, Hartford, Conn.

[21] Appl. No.: 499,642

[22] Filed: Jun. 7, 1995

Related U.S. Application Data

[63] Continuation of Ser. No. 7,341, Jan. 21, 1993, abandoned.

[51] Int. Cl.$^6$ .................................................. B32B 3/12
[52] U.S. Cl. ........................... 428/116; 428/36.3; 428/408
[58] Field of Search ................................. 428/116, 118, 428/36.3, 408

[56] References Cited

U.S. PATENT DOCUMENTS

| | | | |
|---|---|---|---|
| 3,559,708 | 2/1971 | Cook | 206/521 |
| 3,577,836 | 5/1971 | Tamura | 428/116 X |
| 3,635,070 | 1/1972 | Hoyle et al. | 428/116 X |
| 3,756,080 | 9/1973 | Pringle | 73/290 R |
| 4,136,846 | 1/1979 | Brault | 428/116 X |
| 4,352,851 | 10/1982 | Heitz et al. | 428/250 |
| 4,865,899 | 9/1989 | Reichert | 428/189 |
| 4,954,382 | 9/1990 | Riefler et al. | 428/290 X |
| 5,022,307 | 6/1991 | Gibbons, Jr. et al. | 89/34 X |

FOREIGN PATENT DOCUMENTS

| | | |
|---|---|---|
| 0237095 | 9/1987 | European Pat. Off. . |
| 2155873 | 10/1985 | United Kingdom . |
| WO9014862 | 12/1990 | WIPO . |

OTHER PUBLICATIONS

International Search Report dated Jun. 13. 1994.

*Primary Examiner*—Henry F. Epstein
*Attorney, Agent, or Firm*—McAulay Fisher Nissen Goldberg & Kiel, LLP

[57] ABSTRACT

A pressure tolerant composite panel has an inner fiber reinforced layer, an outer fiber reinforced layer and an core disposed therebetween. In one embodiment of the invention, the inner layer has weakening structures incorporated at the peripheral edges thereof, and has an outer layer of a different and lower modulus of elasticity than the inner layer to provide some degree of elongation. When high internal forces are encountered, the weakening structures allow the inner layer to separate, with the outer layers stretching to absorb the forces without failure. Optionally, strengthening straps are position about the panel such that it is compartmentalized into discrete sections to contain damage in localized areas. In an alternative embodiment of the invention, the inner core is produced of a crushable material which has a yield strength sufficient to provide structural support under normal operating conditions. When a high pressure is encountered which exceeds the yield limit, the core is crushed to prevent force transmission to the outer layer. Such a composite panel assures survivability of the panel when subject to impact damage.

17 Claims, 4 Drawing Sheets

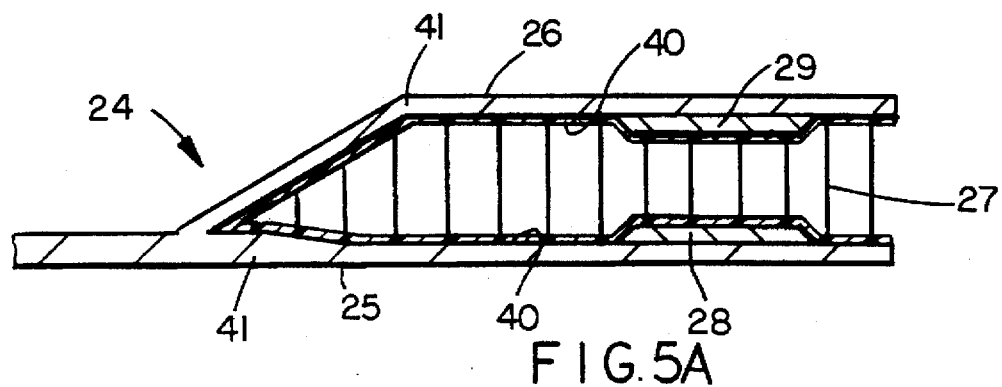
FIG. 5A
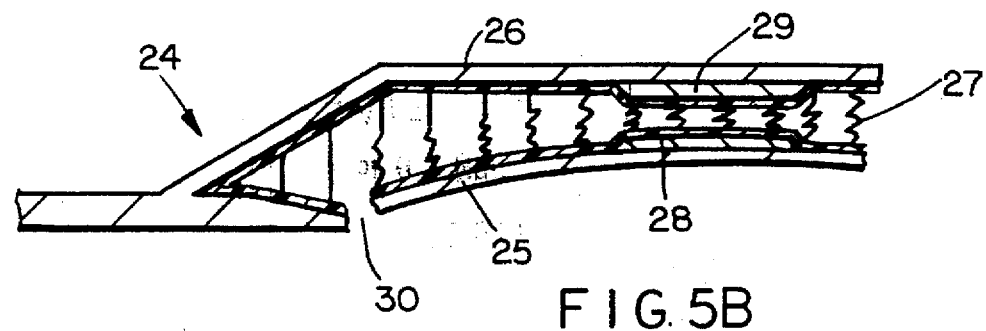
FIG. 5B
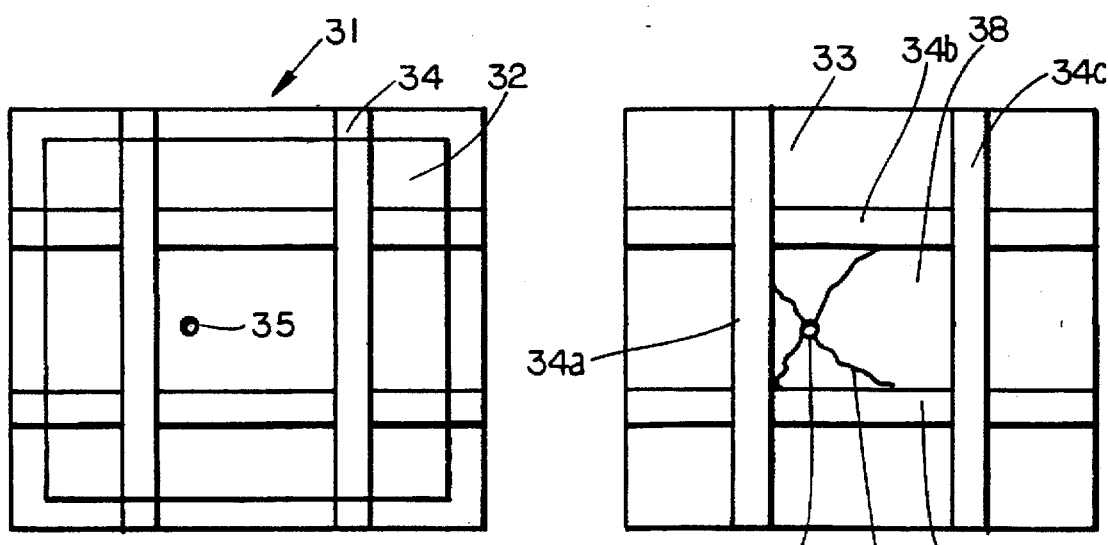
FIG. 7A
FIG. 7B

1

PRESSURE TOLERANT FUEL TANK PANELS

This is a continuation, of application Ser. No. 08/007,341, filed Jan. 21, 1993, now abandoned.

TECHNICAL FIELD

This invention relates to composite panels for aircraft and more particularly to composite panels which are resistant to high pressure and impact stresses to minimize damage.

BACKGROUND

Composite materials such as graphite reinforced epoxy are rapidly displacing metal as the material of choice in modern aircraft design. Such materials provide low weight and high strength, and the ability to avoid multi-part assembly using various integrating molding techniques. One use for composite materials is to form panels which are assembled to produce aircraft structures. In particular, graphite reinforced composite panels may be used to provide the structural surfaces which can serve as containment walls for an integrated fuel tank containing a fuel bladder.

When constructing a fuel tank in this manner, it is typical to provide some degree of ballistic tolerance, as impact damage, for example from a projectile or other foreign object, may cause a fuel release and loss of aircraft propulsion or, if the fuel tank support structure also serves as a primary aircraft structure, extensive damage may cause loss of structural integrity.

Graphite composite panels, while of high strength and light weight, have been discovered to be susceptible to severe damage when subjected to a "hydraulic ram" effect. When a high speed object, such as a projectile, penetrates a fuel tank and enters the fuel-containing interior, it is slowed down due to drag forces. As it slows, the object transfers its kinetic energy to the surrounding fluid. This generates an intense pressure wave which stresses the fuel cell walls. It has been discovered that as the pressure wave acts on the fuel cell wall opposite the object entry point, it stresses the panel before impact to such an extent that a subsequent impact may cause severe damage by fracturing the periphery of the panel as opposed to the expected simple penetration damage. This may result in catastrophic failure of the fuel tank.

SUMMARY OF THE INVENTION

It is an object of the present invention to provide a panel produced of fiber reinforced composite material resistant to impact failure subsequent to a hydraulic ram effect.

It is a further object to provide a panel which has means to minimize pressure and impact damage at both the foreign object entry and exit locations in a fuel tank.

It is a further object to provide a composite panel having a pressure absorbing core which provides structural strength during normal operations but is crushable when subject to a hydraulic ram effect.

It is further object to provide a composite panel which has means for allowing absorption of the hydraulic ram effect through flexing of an outer layer of the composite panel to prevent stressing prior to impact.

These and other objections of the present invention are achieved by a composite panel comprising an inner fiber reinforced layer, a strengthening core, an outer fiber reinforced layer, means for partially releasing the inner fiber layer at the periphery thereof, the outer layer having a lower modulus of elasticity than the inner layer which allows the outer layer to flex and absorb a high internal pressure without separation from adjacent structures.

In an alternative embodiment of the present invention, the composite panel comprises an inner fiber reinforced layer, an outer fiber reinforced layer, and a strengthening core produced of a material which is crushable to absorb a high internal pressure to prevent stress build up and rigidifying of the outer layer. Optionally, strap means are placed in a spaced apart orientation over the outer layer, the strap means composed of a fiber material having a different modulus of elasticity then the fiber used to produce the outer layer. The strap means act as a flexible reinforcement to allow some give in the underlaying outer layer yet restrains the entire panel to prevent peripheral panel failure. Such straps have the additional advantage of compartmentalizing the panel into discrete sections to limit crack propagation.

Utilizing the present invention, rigidifying of the composite panel is avoided thus preventing peripheral panel failure. In addition, the inventive construction limits impact damage to localized penetration with some restricted localized cracking to prevent drastic fuel loss. Consequently, utilizing the panels of the present invention provides a substantial increase in fuel tank survivability.

BRIEF DESCRIPTION OF THE DRAWINGS

FIG. 5A shows an alternative embodiment of the invention incorporating a crushable core between inner and outer layers; FIG. 5B shows the absorption of a high internal pressure by the crushable core such that the outer layer is not over-stressed.

FIG. 7A shows a composite panel of the invention with typical entry damage; FIG. 7B shows typical minimized exit damage for a compartmentalized panel constructed according to the invention.

DETAILED DESCRIPTION OF THE INVENTION

Figure 1A:
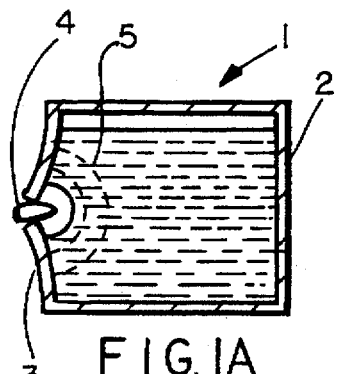
FIGS. 1A, 1B and 1C are sequential views of a prior art fuel tank undergoing impact by a foreign object.
Figure 1B:
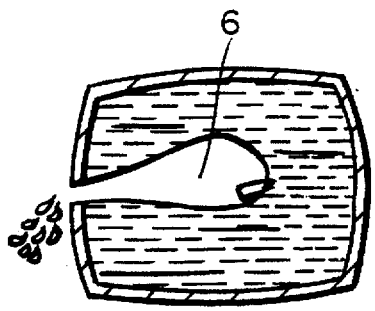
Figure 1C:
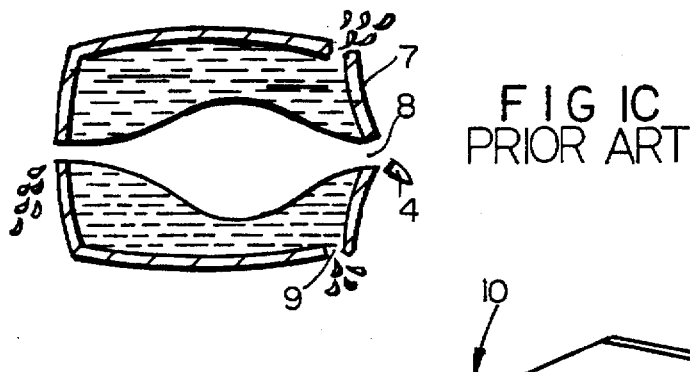

Referring to FIGS. 1 A–C, a typical impact sequence is shown with a prior art composite fuel tank. In FIG. 1A, a fuel tank 1 contains a fuel 2 and has a first wall 3 which is impacted by an object 4. This causes a pressure wave 5 to be initiated. In FIG. 1B, the object creates a cavity 6 and the displaced fluid and pressure wave cause each of the other tank walls to bulge outwardly. The walls are thus stretched to their limit. In FIG. 1C, the object 4 impacts a tank wall 7, causing localized impact damage 8 and failure at the peripheral edges 9 due to the pre-stressing of the panel and the impact stresses.

Figure 2:
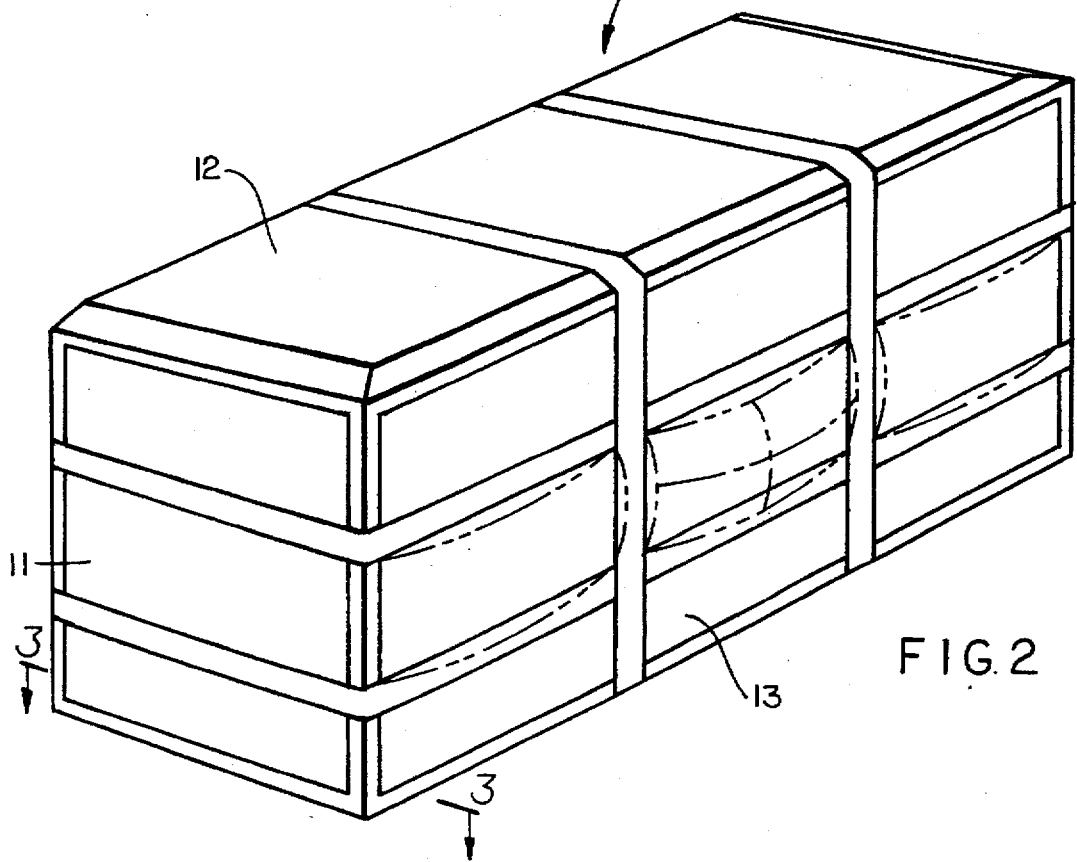
FIG. 2 is a perspective view of a fuel tank constructed according to the present invention showing in phantom the membrane-like expansion of a side panel subjected to hydraulic ram.

Referring to FIG. 2, a fuel tank 10 constructed according to the present invention is shown. The fuel tank 10 has an end wall 11, a top wall 12, and a side wall 13. Each of the walls is a composite panel having a particular arrangement of materials assembled in accordance with the present invention.

Figure 3:
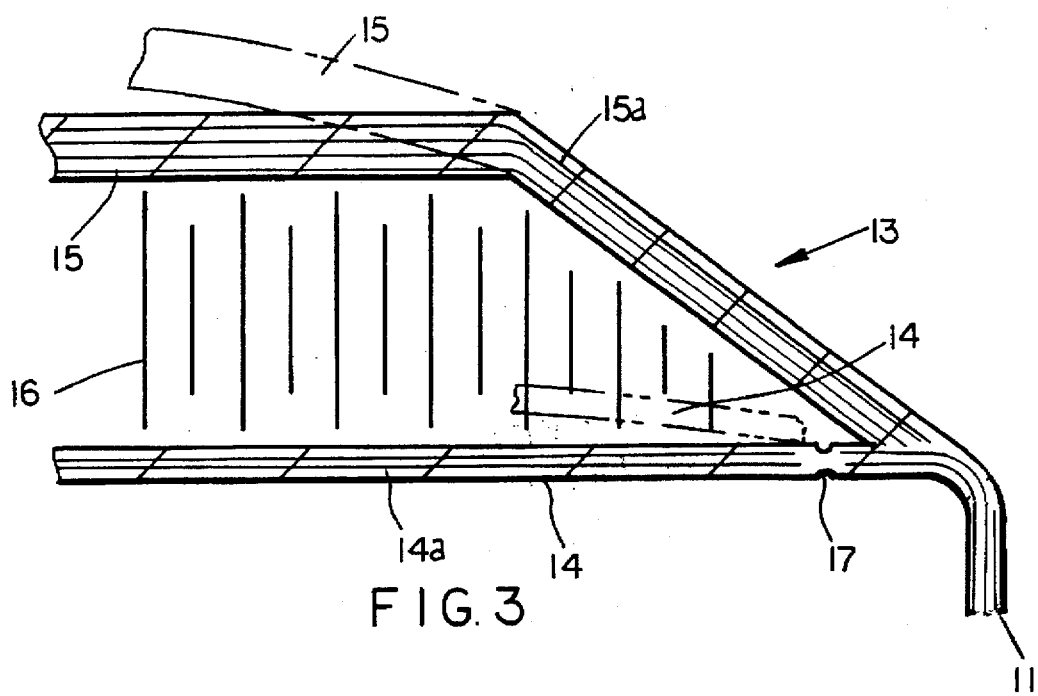
FIG. 3 is a cross-sectional view taken along lines 3—3 of FIG. 2.

Referring to FIG. 3, a cross-sectional view of the side wall 13 is shown in partial section. The sidewall is a composite panel which incorporates an inner layer 14, composed of a fiber reinforced plastic material preferably being an assembly of fiber reinforced plies 14a, an outer layer 15 also composed of a fiber reinforced plastic material and a core 16 sandwiched between the layers which provides additional structural stiffness to the side wall. The outer layer is composed of the minimum amount of structural plies 15a, which are necessary for containing the fuel with a margin of safety. The plies are chosen in terms of choice of fiber and/or orientation such that the layer has the additional ability to flex to a marginal degree in order to absorb some force, allowing it to deform in a membrane-like manner by stretching. The inner layer 14, has continuous or discontinuous weakening structures 17, at the periphery thereof which have sufficient strength to resist normal operating forces for example to contain the weight of the fuel with a margin of safety, yet are sufficiently weak to fracture when subject to higher pressures which may result for example, from a hydraulic ram effect. Thus, the inner layer works with the outer layer as the main fuel tank support structure, the outer layer acting as a redundant structure when the inner layer fails due to any over pressure (i.e., hydraulic ram).

Referring still to FIG. 3, as shown in phantom, a pressure wave encountered by the inner layer would fracture the weakening structure 17. This displaces the inner layer 14 outwardly into the core 16. This would absorb some of the force. The force then acts on the outer layer 15, causing it to react in a membrane-like manner to absorb the remaining force. The inner layer 14 and core 16 also first contact the penetrating object, to dampen the impact damage on the outer layer and to reduce the propensity for peripheral edge damage.

Optionally, strengthening straps are molded around the exterior and/or interior of each composite panel, preferably on both sides to control the extent of local damage to the panel.

Figure 4A:
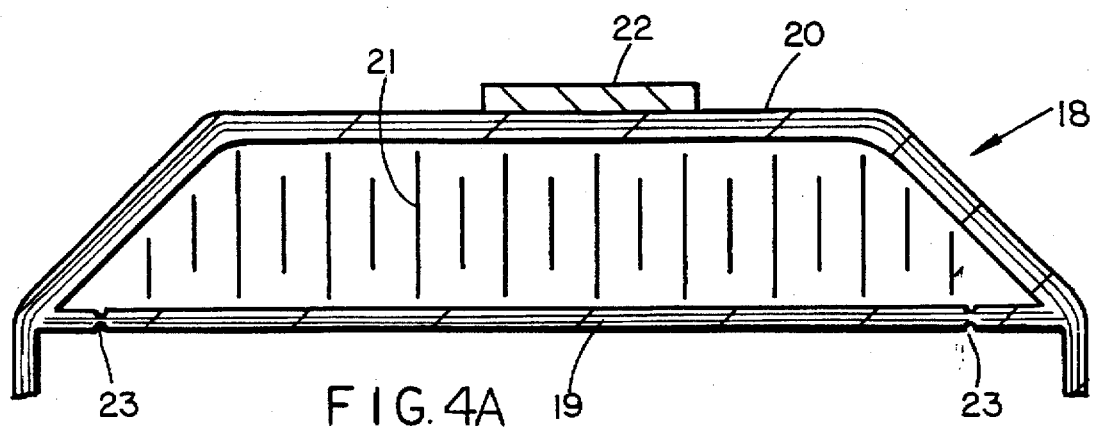
FIG. 4A is a cross-sectional view illustrating a composite panel prior to impact.

Referring to FIG. 4a, a panel 18, has an inner layer 19, an outer layer 20, an intermediate core 21 and additionally has a strap 22, placed over the outer layer, extending over a part of its surface. Generally, the straps have a modulus different from the modulus of the underlying layers to provide intermediate strengthening of the panel for locally high displacements and thus the straps absorb some of the force of impact to prevent its transmission to the peripheral edges. Consequently, an impact within any section bounded by crossing straps would reduce the propagation of the impact force to the edges of the fuel tank and prevent periphery damage. The straps thus compartmentalize the damage by sectioning the panel.

Figure 4B:
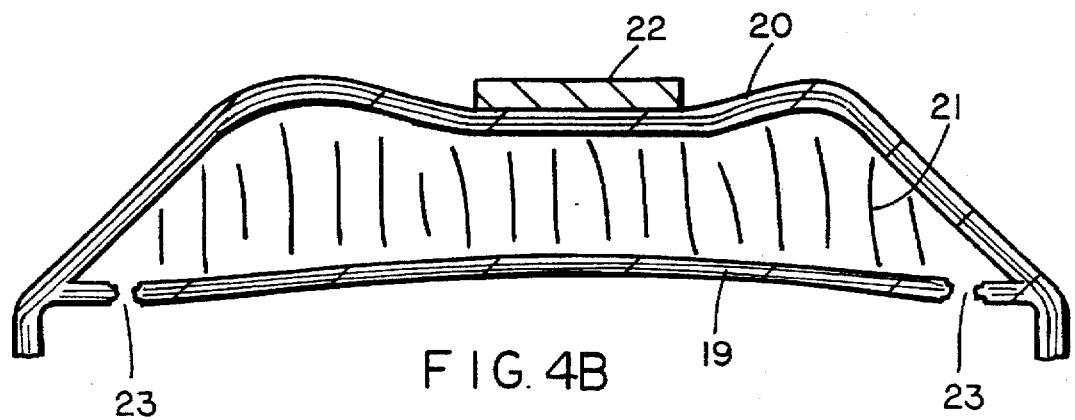
FIG. 4B shows the panel absorbing an internal high pressure by release of an inner layer and flexing of an outer layer.

In FIG. 4B, the effects of an impact are shown where a pressure wave has broken the inner layer 19 at the periphery weakening structures 23, displacing the inner layer to press the core 21 against the outer layer 20. The strap 22 provides reinforcement in a selective limited area, absorbing some of the force which would otherwise be transmitted entirely to the outer layer peripheral edges. The strap 22 also assists in localizing the penetration damage. Thus, this compartmentalization of the panel increases the survivability of the panel.

The panel of the invention includes an inner layer composed of a fiber reinforced material of relatively high modulus, which acts as the main structural layer. For example, a graphite fiber reinforced epoxy material may be used. The outer layer is preferably composed of a lower modulus material to permit high elongation. Glass fiber or polyaramid fiber reinforced epoxy would be typical. The weakening structures along the edges of the panel can be provided by undercutting or overlapping individual plies to form a weak spot in a designated area. The strapping means should be of a comparable high elongation material such as glass fiber reinforced epoxy to allow the outer layer to act as a flexible membrane, but are somewhat stronger to selectively reinforce the outer layer, allowing non-reinforced areas to flex in a compartmentalized manner. The core material may be rigid such as a graphite honeycomb core or metal honeycomb core chosen for its structural properties, and bonded between the layers. With this embodiment of the invention, the choice of core is non-limiting.

Referring to FIG. 5A, an alternative embodiment of the present invention is shown. A panel 24 has an inner layer 25, an outer layer 26, and a core 27 disposed therebetween. Inner and outer straps 28 and 29 are incorporated in the inner and outer layers. In this embodiment, the core provides structural support to the layers but is composed of a crushable material having a designated yield limit rather than being a relatively rigid material as is commonly used. By being crushable, adequate structural strength for normal operating forces is assured. However, when an extraordinary force is encountered, rather than transmitting the force through the core, the core absorbs the force by crushing. Preferably, the core has a threshold yield strength which, when exceeded, causes the core to deform. The core is then crushed to absorb the force, preventing over stressing of the outer layer.

Referring to FIG. 5B, the panel of FIG. 5A is shown as subjected to a hydraulic ram force. The inner layer 25 has fractured at portion 30, and is displaced outwardly. However, rather than transmitting the force to the outer layer 26, the core 27 collapses and compacts, thus preventing transmission of the force to the outer layer. Subsequent impact by an object would thus not encounter a rigidified outer layer and the potential for peripheral damage is reduced.

Figure 6:
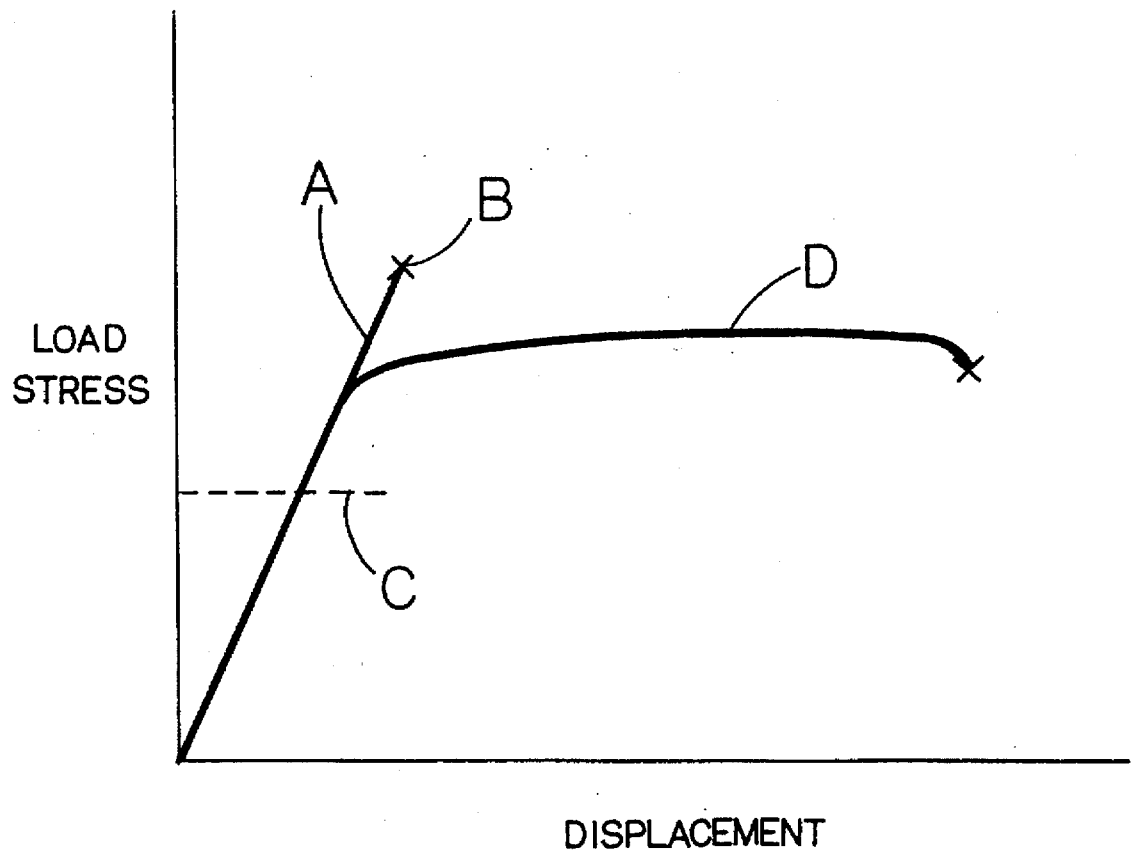
FIG. 6 is a graph showing load stress versus displacement for various core structures.

For purposes of this application, a "crushable" core is one which has sufficient stiffness to assure structural integrity without deformation when subjected to normal operating forces such as fuel weight or sloshing during various aircraft maneuvers, yet which above a designated limit, yields by deformation and crushing to absorb additional forces. Generally, a core structure having a shear strength of 300 psi, and a stiffness modulus of 180 ksi compressive, and a transverse shear modulus of 70 ksi is satisfactory. FIG. 6 shows the preferred failure sequence. A rigid core which is not crushable transmits all loads to the outer layer point of failure indicated by line A and point B. Line C shows the limit for normal operating forces. Using a crushable core, substantial displacement of the core before failure absorbs energy to dampen the effects on the outer layer as shown by line D. Thus, materials such as rigid but collapsible foam, and metal cores of relatively low density can be used as cores in the present invention.

An additional advantage when utilizing the crushable core in combination with strapping means is that the panels have enhanced resistance to impact damage.

Referring to FIGS. 7A and 7B, a panel 31 constructed in accordance with the panel shown in FIGS. 5a and 5b has an outer layer 32, an inner layer 33 and straps 34. In FIG. 7A, the outer layer has typical entry damage limited to a puncture 35 approximating the shape of the impacting object. In FIG. 7B, the inner layer 33 has typical exit damage when utilizing the present invention. The inner layer also has a puncture 36 approximating the shape of the object, with radiating cracks 37. Notably, the cracks remain within a compartmentalized section 38 defined by straps 34a, b, c, d. The collapsible core has reduced damage by absorbing kinetic energy as the object moves through it. In addition, the straps compartmentalize the panel by defining panel sections, the straps then acting to minimize crack propagation from the object exit point. Such minimized damage additionally minimizes the potential for catastrophic fuel tank failure due to impact.

The inner and outer layers may be composed of graphite fiber reinforced epoxy layers, composed of multiple plies of graphite fiber reinforced material. The core is preferably produced of aluminum. The aluminum core is preferably a honeycomb design having a weight of at least 4.5 lbs. per cubic foot up to about 8 lbs. per cubic foot. Below 4.5 lbs per cubic foot, normal forces deform the core, over 8, crushing does not occur before transmission of substantial force to the outer layer. In terms of thickness, the core is about ½" to 1" thick. The graphite layers are composed of multiple plies, each ply typically being about 0.0075" thick. Up to 14 plies may be used to form the inner and outer layers. Typically, each layer has a thickness of about 0.030" overall, made up of from 3-6 plies. Preferably, insulating facing layers are disposed between the core and the inner and outer layers to limit galvanic corrosion. In FIG. 5a, a pair of glass fiber reinforce epoxy veil plies 40 insulate the graphite plies 41 from the aluminum to avoid galvanic corrosion. As in the other embodiment, the strapping means are glass fiber reinforced epoxy straps which resist the hydraulic ram pressure by acting as a reinforcement in selected areas for compartmentalizing impact damage.

The glass fiber reinforced straps have an elongation approximately one to two times that of graphite. The typical fuel cell is 7' long by 3' high and the straps, being approximately 2" wide, are placed on the panel at a spacing of 7–8". The glass fiber reinforce straps preferably are composed of four plies of glass reinforced epoxy having a total thickness of 0.030".

COMPARATIVE EXAMPLE I

A panel having a graphite fiber reinforced epoxy inner layer, a graphite fiber reinforced epoxy outer layer and a rigid core was tested for impact damage. The inner and outer layers were constructed with four plies each to have thicknesses of 0.030". The rigid core was composed of graphite honeycomb having an 8 lb. density (HEXCELL, HFT-G 3⁄16-8).

After impact, the panel had major core and layer damage.

COMPARATIVE EXAMPLE II

A panel composed of graphite fiber reinforced epoxy in accordance with comparative example I additionally included hat section stiffeners, i.e. discontinuous corrugations as backing to strengthen the outer layer. When subjected to projectile impact, it was found that the stiffeners broke away from the panel upon impact, and the panel had major damage.

COMPARATIVE EXAMPLE III

A panel composed of graphite fiber reinfored epoxy constructed in accordance with comparative example I had continuous corrugated stiffeners embedded in it. The stiffeners thus supported the entire outer layer. The panel was subjected to impact damage, and it was found that the stiffeners broke away from the panel upon impact, and the panel suffered major damage.

COMPARATIVE EXAMPLE IV

A sandwich panel construction was prepared having graphite fiber reinforced epoxy inner and outer layers each composed for four plies in accordance with comparative example I, and a rigid aluminum core composed of ⅛" cell size, 5056 aluminum alloy with a foil thickness of 0.002" for a density of 8.1 lbs/ft³. The panel was subjected to impact by a projectile. Entry damage was limited to a puncture comparable to the projectile diameter used in the test. However, on the exit side of the panel, major outer layer failure occurred.

EXAMPLE V

A panel constructed according to the present invention was subjected to impact damage. The panel contained graphite fiber reinforced epoxy inner and outer layers, each having four plies of graphite, fiber reinforced epoxy. Glass fiber reinforced epoxy veil plies were used to insulate the graphite fiber reinforced layers from a crushable aluminum core composed of ⅛" cell size 5056 aluminum alloy, with a 0.001" foil thickness and having a density of 4.5 lbs/ft³. Glass fiber reinforced epoxy straps were provided on the inner and outer surfaces of the panel. The straps were about 2 inches wide and spaced apart by about 8". When subjected to projectile impact, entry damage was limited to a hole comparable to the size of the impacting projectile, and exit damage was limited to a puncture and facing cracks which were arrested at the glass fiber reinforced epoxy straps within the compartmentalized portion of the panel. This was the only panel configuration which limited damage to survivable levels.

The combination of a relatively stiff but crushable core, which minimizes the extent of puncture damage and hydraulic ram effect, the graphite fiber reinforced epoxy layers, which provide sufficient strength to resist forces typically encountered, and glass fiber reinforced epoxy straps, with high strength capability for reinforcing the layers to resist hydraulic ram effect while additionally acting as a means for compartmentalizing impact damage to lessen crack propagation to adjoining areas, provides a superior composite panel for production of a fuel tank.

While preferred embodiments of the present invention have been shown and described, it will be understood by those skilled in the art that various changes and/or modifications could be made without varying from the scope of the present invention.

We claim:

1. A fuel tank having containment walls for containing a fuel, at least one containment wall comprising:
   a pressure tolerant composite panel having an inner fiber reinforced layer, an outer fiber reinforced layer, and a strengthening honeycomb core disposed therebetween produced of a material which is crushable in response to high pressure to prevent a stress buildup, and thereby limit impact damage, in the outer layer of the composite panel, and, a plurality of spaced and crossed strapping means disposed over the outer layer for compartmentalizing the outer layer into discrete sections.

2. The fuel tank of claim 1 wherein the strapping means are composed of one or more plies of a glass fiber or polyaramid fiber reinforced epoxy.

3. The fuel tank of claim 1 wherein the honeycomb core is an aluminum honeycomb core.

4. The fuel tank of claim 3 wherein the honeycomb core has a weight of at least about 4.5 lbs. per cubic foot.

5. The fuel tank of claim 3 wherein the honeycomb core has a weight of from about 4.5 to 8 lbs. per cubic foot.

6. The fuel tank of claim 1 wherein the inner layer is composed of one or more plies of a graphite fiber reinforce epoxy material.

7. The fuel tank of claim 1 wherein the outer layer is composed of one or more plies of a graphite fiber reinforced epoxy material.

8. The fuel tank of claim 1 further comprising means for partially releasing the inner fiber layer at the periphery thereof, said means being weakening structures disposed along the edges of the panel.

9. The fuel tank of claim 1 wherein the plurality of strapping means are disposed over the outer layer surface in a crossing pattern.

10. A fuel tank having containment walls for containing a fuel, at least one containment wall comprising:

a pressure tolerant composite panel having a fiber reinforced inner layer, a fiber reinforced outer layer, and a strengthening honeycomb core disposed therebetween, the inner layer having means for partially releasing the inner layer at the periphery thereof to absorb forces, the outer layer having a lower modulus of elasticity than the inner layer, such that the outer layer flexes in a membrane like manner to absorb forces, and, a plurality of strapping means disposed over the outer layer in a crossing pattern which compartmentalizes the outer layer into discrete sections.

11. The fuel tank of claim 10 wherein the inner layer is composed of one or more plies of a fiber reinforced material of relatively high modulus.

12. The fuel tank of claim 10 wherein the inner layer is composed of one or more plies of a graphite fiber reinforced epoxy material.

13. The fuel tank of claim 10 wherein the outer layer is composed of one or more plies of a glass fiber or polyaramid fiber reinforced epoxy material.

14. The fuel tank of claim 10 wherein the means for partially releasing the inner fiber layer at the periphery thereof comprise weakening structures disposed along the edges of the panel.

15. The fuel tank of claim 10 wherein the strapping means are composed of a high elongation material.

16. The fuel tank of claim 10 wherein the strapping means are composed of a glass fiber or polyaramid fiber reinforced epoxy.

17. The fuel tank of claim 10 wherein the composite panel further comprises an insulating facing layer located between the core and the inner and outer layers.

* * * * *